(12) United States Patent
Chanda et al.

(10) Patent No.: US 10,038,622 B2
(45) Date of Patent: Jul. 31, 2018

(54) INLINE PROCESSING OF LEARN ACTIONS IN A VIRTUAL SWITCH

(71) Applicant: Nicira, Inc., Palo Alto, CA (US)

(72) Inventors: Anupam Chanda, Los Altos, CA (US); Harold Vinson C. Lim, Union City, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 15/280,365

(22) Filed: Sep. 29, 2016

(65) Prior Publication Data

US 2018/0091415 A1    Mar. 29, 2018

(51) Int. Cl.
*H04L 12/28* (2006.01)
*H04L 12/751* (2013.01)
*H04L 12/721* (2013.01)
*H04L 29/06* (2006.01)

(52) U.S. Cl.
CPC .............. *H04L 45/02* (2013.01); *H04L 45/26* (2013.01); *H04L 45/38* (2013.01); *H04L 69/16* (2013.01)

(58) Field of Classification Search
None
See application file for complete search history.

(56) References Cited

U.S. PATENT DOCUMENTS

| 6,665,725 | B1 * | 12/2003 | Dietz | G06F 17/30985 |
| | | | | 709/230 |
| 6,975,639 | B1 * | 12/2005 | Hill | H04L 47/10 |
| | | | | 370/412 |
| 2008/0080512 | A1 * | 4/2008 | Gofman | H04L 29/12028 |
| | | | | 370/392 |
| 2015/0016460 | A1 * | 1/2015 | Zhang | H04L 45/38 |
| | | | | 370/392 |
| 2015/0071289 | A1 * | 3/2015 | Shin | H04L 45/745 |
| | | | | 370/392 |
| 2015/0092605 | A1 * | 4/2015 | Aybay | H04L 49/35 |
| | | | | 370/254 |
| 2015/0124815 | A1 * | 5/2015 | Beliveau | H04L 45/38 |
| | | | | 370/392 |
| 2016/0248673 | A1 * | 8/2016 | Beliveau | H04L 45/38 |

\* cited by examiner

*Primary Examiner* — Rebecca E Song (57) ABSTRACT

Described herein are systems, methods, and software to enhance inline processing of data packets by a virtual switch. In at least one implementation, a virtual switch receives a data packet and initiates a flow process with a plurality of flow operations on the data packet. In a flow operation of the plurality of flow operations, the virtual switch will determine whether the data packet qualifies for a learn action and, if the packet fails to qualify, forwards the data packet to a next flow operation in the plurality of flow operations, and if the packet does qualify, applies the learn action and forwards the data packet to a next flow operation.

20 Claims, 7 Drawing Sheets

INLINE PROCESSING OF LEARN ACTIONS IN A VIRTUAL SWITCH

TECHNICAL BACKGROUND

In computing environments, virtual switches may be used that comprise software modules capable of providing a communication platform for one or more virtual nodes in the computing environment. These virtual switches may be used to intelligently direct communication on the network by inspecting packets before passing them to other nodes on the same network. For example, packets may be inspected to determine the source and destination internet protocol (IP) addresses to determine if the communication is permitted to be delivered to the destination computing node. In some implementations, virtual switches may be configured with flow processes that can include one or more flow operations, or tables, that define rules and actions to be taken against a packet. These flow operations identify specific attribute values, such as IP addresses, media access control (MAC) addresses, and the like, within the data packet and, when identified, provide a set of actions to be asserted against the data packet. These actions may include modifications to the data packet, forwarding rules for the data packet, amongst other possible operations.

To manage virtual switches, communication protocols, such as OpenFlow and/or other software defined networking (SDN) protocols, may be used, wherein the protocols enable network controllers to determine the path of network packets across a network of switches. In particular, in some implementations, virtual switches may be distinct from the controllers that supply packet forwarding configurations. These controllers may, using the communication protocol, provide layer 3 remote administration by modifying forwarding tables, and by adding, modifying, and removing packet matching rules and actions. However, limitations exist with the control communication protocol and implementation of rules on received packets. These limitations may prevent new packet rules from being applied to the same packet that triggered the implementation of the packet rule. Thus, a new rule could only be applied to a second packet after the first packet triggered the implementation of the new rule.

OVERVIEW

The technology disclosed herein enhances inline processing of data packets in a virtual switch. In one implementation, a method of managing learn actions in a network switch having a forwarding plane controlled by a communications protocol includes receiving a data packet from a computing node. The method further provides, initiating a first flow process for the data packet, wherein the first flow process comprises a plurality of flow operations to be performed against the data packet. The method also includes, in a flow operation of the plurality of flow operations, identifying whether the data packet qualifies for a learn action. If the data packet fails to qualify for the learn action, the method provides for forwarding the data packet to a next flow operation in the plurality of flow operations, and if the data packet qualifies for the learn action, applying the learn action to the data packet and forwarding the data packet to a second flow process.

In at least one implementation, the flow operation may comprise a Boolean operation to compare two or more values within the data packet. Based on the Boolean operation, the method may set an indicator value for the data packet, which can be used in determining how the packet is forwarded by the virtual switch.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The various examples disclosed herein provide enhancements to providing flow operations on data packets received at virtual switches. In particular, when data packets are received by a virtual switch from computing nodes logically connected to the virtual switch, the virtual switch will enter the data packets into a flow process, wherein the flow process comprises one or more flow operations. These flow operations, in some examples referred to as flow tables, match attributes of incoming packets to defined attributes and, based on the matching, specifies the functions that are to be performed with respect to the data packet. These functions may include forwarding actions, which define the one or more computing nodes to which the received packet is to be forwarded. In some implementations, each of the flow operations may include entries that define match fields to identify relevant packets, instructions to be taken when a match occurs, timeouts to define an idle time before a flow operation is expired by the switch, among other information for the packet.

Here, when attributes within a packet match defined fields within a flow operation, the packet may qualify for a learn action, wherein the learn action is used to identify supplemental attributes of the data packet. In some examples, these supplemental attributes may comprise relationship attributes between two values included within the data packet. For example, a source internet protocol (IP) address for a data packet may be compared against a destination or target IP address within the same packet. Based on the comparison, the learn action may set indicator values associated with the packet to specify whether a match exists. These indicator values may comprise metadata associated with the data packet, registers within the virtual switch, or a value within the data packet itself.

Once the learn action is applied to the data packet, the packet may be forwarded to another flow operation, wherein the flow operation may make forwarding decisions based on the indicator value. Accordingly, referring to the matching of IP addresses, if a match is found, an indicator value may be set and the packet forwarded on the network based on the setting of the value. In contrast, if a match were not found between the addresses, the indicator value may not be set and the packet would be forwarded based at least in part on a match not being identified for the IP address values.

Although a match between two IP address values is described in the previous example, it should be understood that the learn action may provide a variety of other Boolean operations on attributes within a particular data packet. These operations may include determining whether IP addresses do not match in a data packet, determining whether media access control (MAC) addresses do not match in a data packet, or determining any other similar relationship between two values within the data packet.

Figure 1:
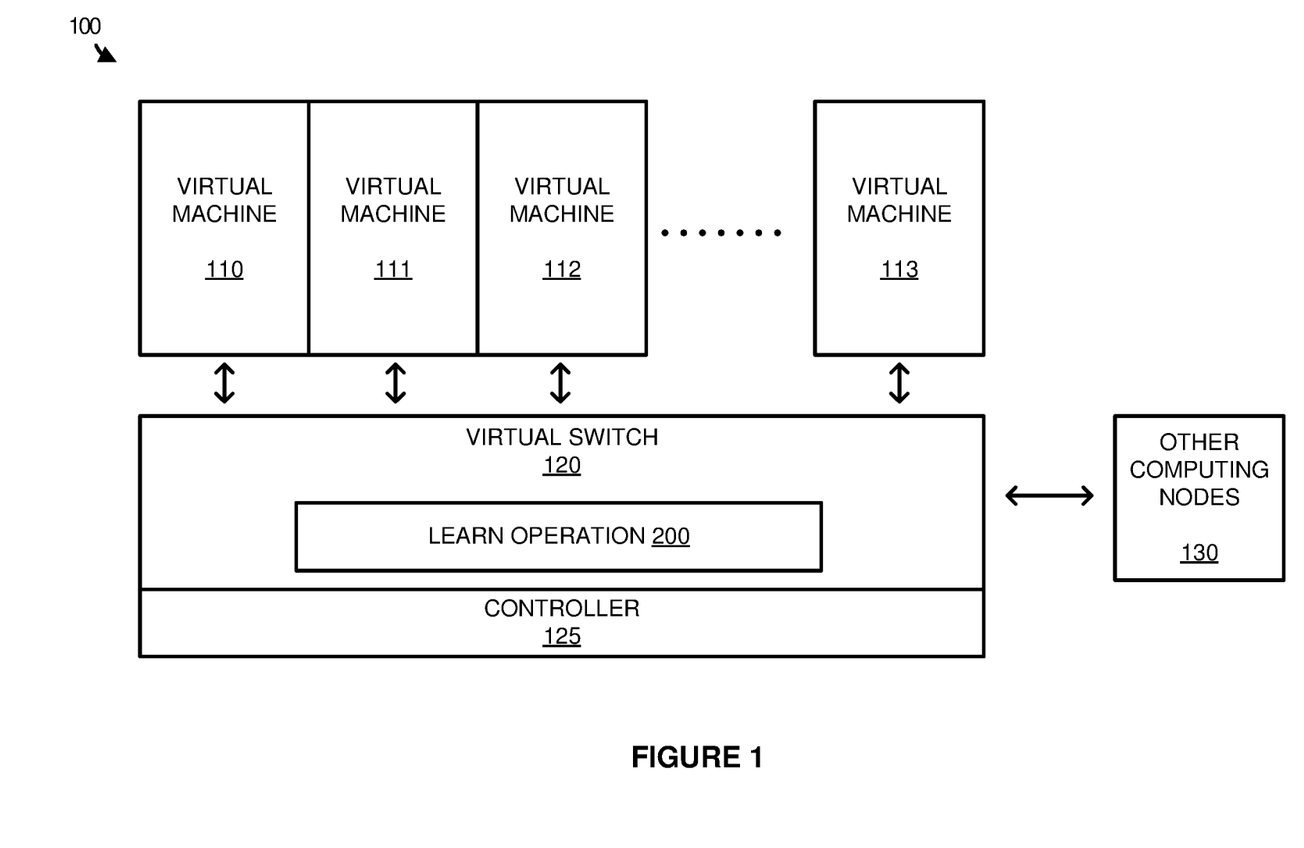
FIG. 1 illustrates a computing environment to implement flow operations in a virtual switch according to one implementation.

FIG. 1 illustrates a computing environment 100 to implement flow operations in a virtual switch according to one implementation. Computing environment 100 includes virtual machines 110-113, virtual switch 120, controller 125, and other computing nodes 130. Virtual switch performs learn operation 200, which is further described in FIG. 2. Virtual machines 110-113, virtual switch 120, and controller 125 may execute on one or more host computing systems, such as servers, desktop computing systems and the like. Other computing nodes 130, which may be omitted in some examples, may comprise other physical or virtual systems capable of communicating with virtual switch 120 via a communication interface, such as a physical network interface controller.

In operation, virtual switch 120 executes to provide communication services for virtual machines 110-113. To provide the communication services, virtual switch 120 may intelligently direct communication on the network by inspecting the packets before forwarding the packets over the network to other virtual machines and computing nodes. This directing of packets may direct packets over a physical network via a physical network interface, or may direct packets to other virtual machines on the same host without forwarding them over a physical network. To provide the inspection of the packets received by virtual switch 120, flow operations (or flow tables) may be defined that permit the virtual switch to quickly identify attributes of the packets, and provide operations based on the attributes of the packets. For example, the flow may be used to commit particular actions against packets with a defined source internet protocol (IP), wherein the source IP address may be defined in a header of the particular packet. In some implementations, the flow operations (or flow tables) may be updated based on information that is provided from controller 125. For example, if a packet is received by virtual switch 120 that cannot be processed by the flow operations currently available to the virtual switch, controller 125 may be used to provide a new flow operation that can be used for the next packet that is received with the same attributes.

Here, in addition to or in place of the update operations that can be provided by controller 125, a learn operation 200 is provided to generate and install a new operation for packets that are received by virtual switch. This learn operation may, in response to a packet qualifying for a learn action, generate and install the learn action to be applied to the packet. Once applied, the data packet may revert back to the original flow, or may continue on a new flow that can be installed with the learn action.

Figure 2:
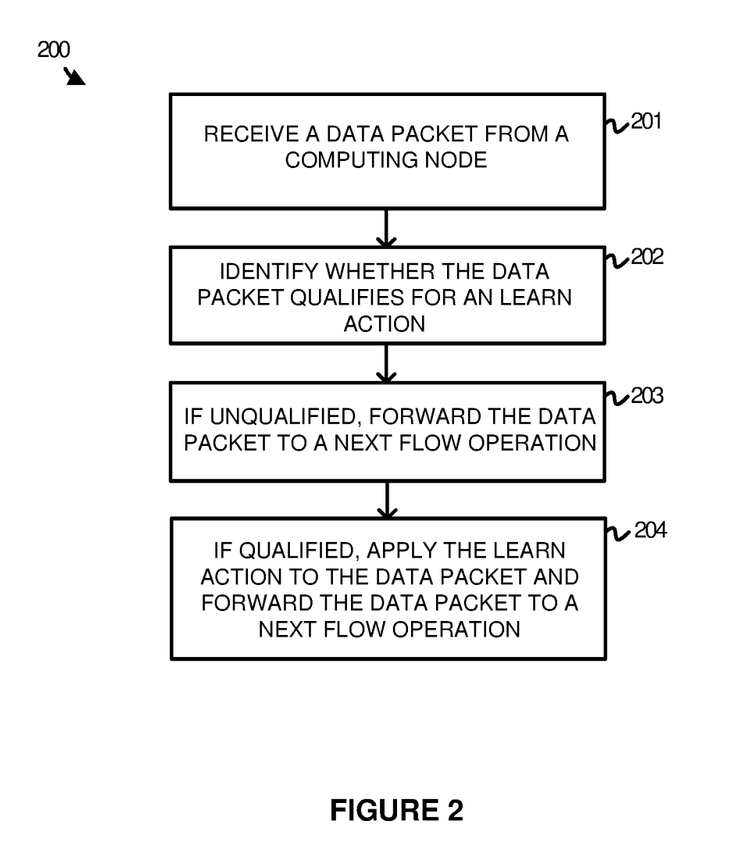
FIG. 2 illustrates a learn operation to implement flow operations in a virtual switch according to one implementation.

Referring now to FIG. 2 to further demonstrate the operations of computing environment 100 of FIG. 1. FIG. 2 illustrates learn operation 200 to implement flow operations in a virtual switch according to one implementation. The operations in FIG. 2 are referenced parenthetically in the paragraphs that follow with reference to systems and objects of computing environment 100 of FIG. 1.

As depicted, learn operation 200 directs virtual switch 120 to receive (201) a data packet from one of the computing nodes communicatively coupled to virtual switch 120. In response to the receiving the data packet, the packet may be placed within a flow process of the forwarding plane, wherein the flow process comprises a plurality of flow operations to be performed against the data packet. In some implementations, these flow operations may comprise flow tables, which may use any attributes provided within the data packet to determine how to forward the data packet to other nodes. This information within the packets may include switch port information for the incoming packet, the source or destination IP address associated with the communication, a virtual local area network (VLAN) tag associated with the packet communication, or any other similar information that can be identified within the packet.

During the operations of the flow process, in a first flow operation, virtual switch 120 identifies (202) whether the data packet qualifies for a learn action, wherein the learn action is not defined by controller 125, but is rather generated and implemented by virtual switch 120 to be applied to the same packet which triggered the generation of the learn action. Consequently, rather than waiting for the next packet to apply the new action, virtual switch 120 may apply the learn action to the same packet. In some implementations, to trigger the generation of the learn action, a flow operation may identify a particular attribute or attributes within the packet. These attributes may include one or more MAC addresses in the packet, IP addresses in the packet, a packet type in the header of the packet, or some other similar attribute within the packet, including combinations thereof. For example, as described in further detail below with reference to FIGS. 4 and 5, a MAC address in the header may be used to trigger a learn action.

Once it is determined whether the packet qualifies for the learn action, operation 200 on virtual switch 120 includes, if the data packet does not qualify for the learn action, forwarding (203) the data packet on the first flow process. Thus, if the packet fails to qualify for the learn action, the learn action will not be installed as part of the flow for the packet, and the packet will be instead forwarded to the next flow operation in the plurality of flow operations corresponding to the first flow process. In contrast, if it is determined that the data packet qualifies for the learn action, operation 200 will direct virtual switch 120 to apply (204) the learn action to the data packet and forward the data packet to a next flow operation.

In some implementations, applying the flow operation may include performing Boolean operations with respect to two or more attributes of the data packet. These Boolean operations may be used to determine information about the data packet that is incapable of being determined using traditional table-based flow operations. For example, flow tables, which can be generated using OpenFlow or some other software defined networking (SDN) protocol, may be incapable of determining when one IP address in a data packet is equal to another IP address within the same data packet. Thus, without the use of a learn action, the data packet may be improperly forwarded over the network or may fail to be properly identified by the virtual switch.

In the present example, to overcome the Boolean shortcomings or other similar shortcomings of the defined control flow operations, a learn action may be applied to the packet to determine further information about the packet before forwarding the packet to the next flow operation. This learn operation may be used to set a metadata bit associated with the data packet, modify the data packet, modify a virtual switch register, or provide some other similar operation with respect to an indicator value associated with the data packet. Once modified, or in some examples not modified depending on the action, the packet may be transferred to the next flow operation. This flow operation may revert back to the flow operations that were implemented before the learn action or move to a separate flow process that is specific to the learned flow operations.

As an illustrative example, during a first flow process for a data packet, a flow operation may determine whether the data packet comprises an address resolution protocol (ARP) packet. Responsive to this identification, learn operation 200 on virtual switch 120 may initiate the institution of a learn action to determine further information about the packet. For example, the learn action may be used to determine whether the data packet comprised a gratuitous ARP (GARP) packet, wherein the source protocol address (SPA) field has the same value as the target protocol address (TPA) field. Thus, a Boolean function or learn function for the GARP packet may be "if SPA==first address AND TPA==first address then set some Boolean context to true for the data packet." This setting of the Boolean context (or setting of an indicator value) may include modifying the packet itself, modifying metadata associated with the packet, or setting a virtual switch register to true for the packet. Once the GARP learn function is applied to the data packet, the data packet may be forwarded to the next flow operation, wherein the flow operation may correspond to the first flow process, or may be forwarded to a new flow process for operations associated with the learn action.

Figure 3:
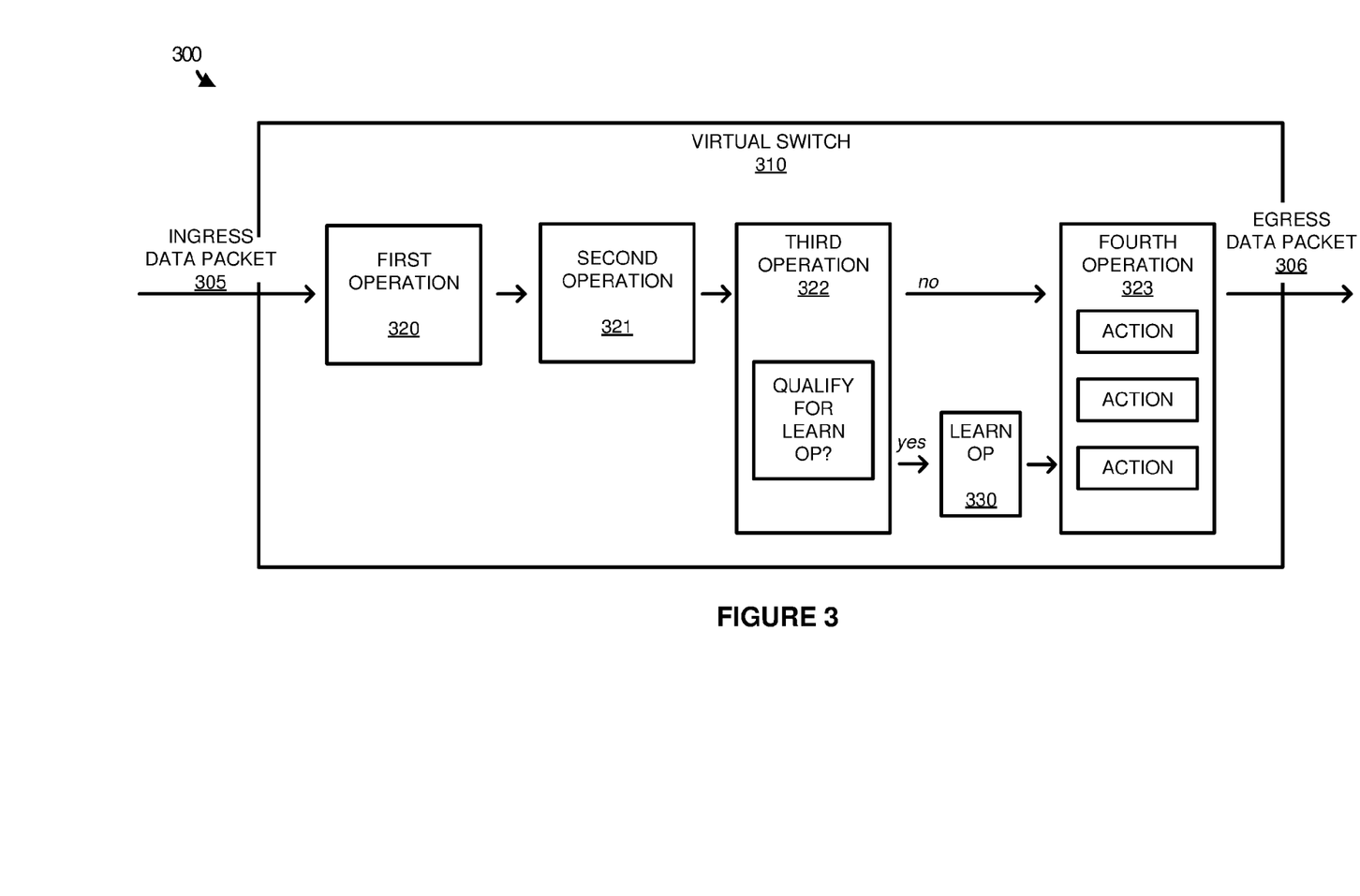
FIG. 3 illustrates an operational scenario of implementing flow operations in a virtual switch according to one implementation.

Turning to FIG. 3, FIG. 3 illustrates an operational scenario 300 of implementing flow operations in a virtual switch according to one implementation. Operational scenario 300 includes virtual switch 310, ingress data packet 305, and egress data packet 306. Virtual switch further includes operations 320-323 and learn action 330. These operations 320-323 correspond to a flow process that is used to determine how ingress data packet 305 should be forwarded over a network. These operations, which may include flow tables, may be used to perform actions on attributes contained within ingress data packet 305 such as the source IP address of the communication, the destination IP address of the communication, any media access control (MAC) information in the packet, or any other similar information. Although illustrated with four operations in the present implementation, it should be understood that any number of operations may be included within a flow process. For example, first operation 320 and second operation 321 may be optional in some examples.

In the illustrated example of FIG. 3, once ingress data packet is received by virtual switch 310, in some examples from a virtual node such as a virtual machine, the packet is passed through first operation 320 and second operation 321. These operations may compare attributes of the data packet to determine the type of packet, the destination of the packet, or any other similar information related to the packet and define actions to be taken with the packet based on an attribute being included. For example, a specific destination IP address included in the packet may be associated with a particular action in forwarding the packet to the destination IP address. In other examples, rather than providing forwarding operations, the action may include implementing Access Control Lists (ACLs), wherein the packet may be blocked from being forwarded to one or more other nodes in the computing network.

After applying first operation 320 and second operation 321, the packet is forwarded in the flow process to third operation 322, wherein third operation 322 is used to determine whether the data packet qualifies for a learn action. If the packet fails to qualify for the learn action, the packet may be forwarded to fourth operation 323. In contrast, if the packet does qualify for the learn action, then learn action 330 is generated and applied to the packet before the packet is forwarded to fourth operation 323. In some implementations, learn action 330 may be used to determine whether or not an indicator value should be set that is associated with the packet. This indicator value may comprise a metadata value associated with the packet, a value within the packet itself, or a register on the virtual switch that can be associated with the data packet. Once determined, the indicator value can then be used by fourth operation 323 to determine what action should be taken with respect to the packet.

In some examples, in setting an indicator value, the indicator value may be used to set a priority for an action to be taken at fourth operation 323. In particular, if the data packet qualified for two actions to be taken at fourth operation 323, learn action 330 may define a priority level to indicate that the action associated with learn action 330 should be taken over another action that the packet may also qualify for. Returning to the ARP and GARP example described above, if learn action 330 identified that the packet qualified as a GARP packet, then the GARP action in fourth operation 323 may be taken over an ARP action, although the packet qualified for both actions.

Figure 4:
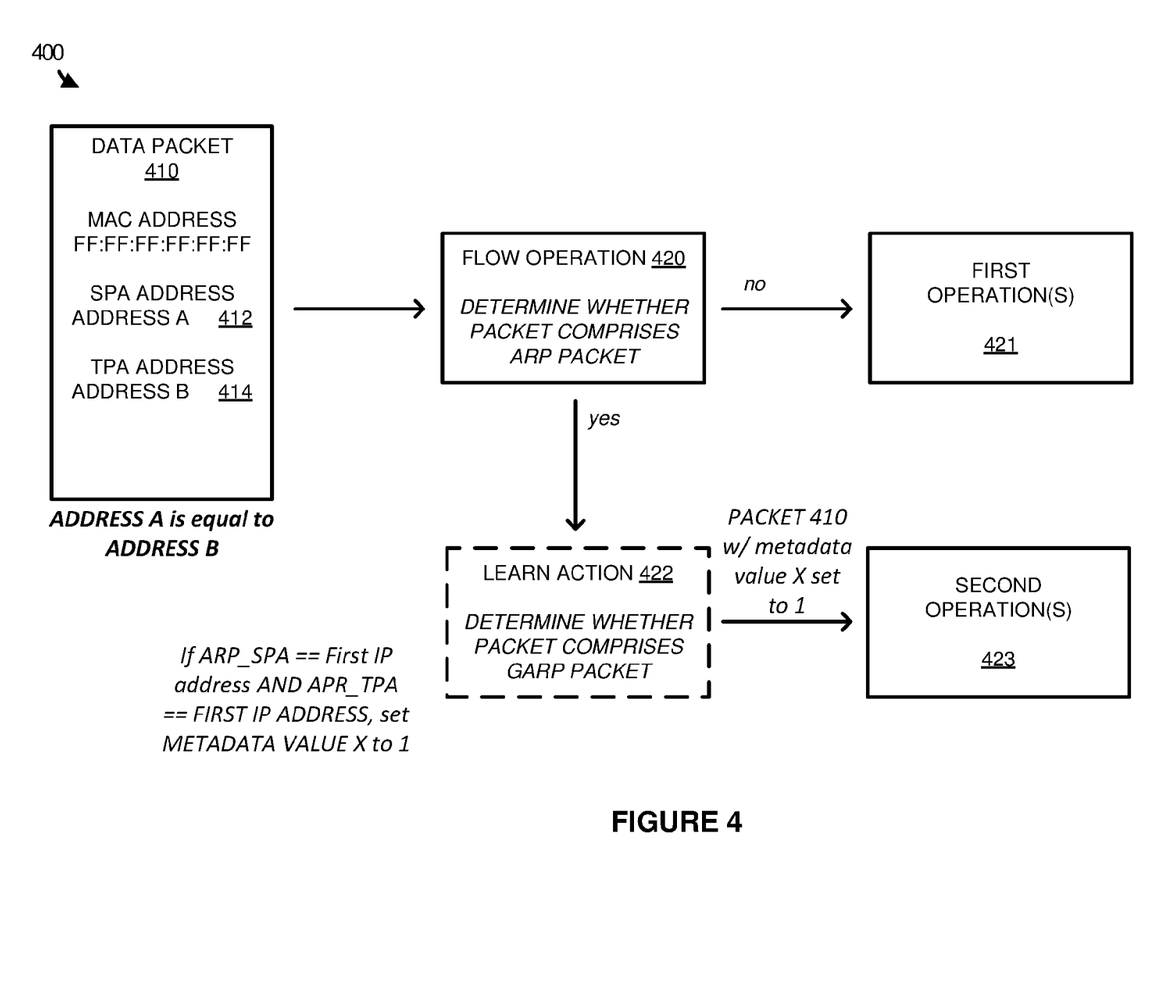
FIG. 4 illustrates an operational scenario of implementing flow operations in a virtual switch according to one implementation.

FIG. 4 illustrates an operational scenario 400 of implementing flow operations in a virtual switch according to one implementation. Operational scenario 400 provides an example of processing a data packet 410 to determine attributes of the packet, wherein the packet includes a destination MAC address, a SPA address, and a TPA address. Based on these attributes, the virtual switch may provide various operations on the packets to determine how the packets should be forwarded to other nodes of the network.

In the particular example of operational scenario 400, once data packet 410 is received by the virtual service, the packet may be processed using a defined first flow process, wherein the first flow process may include a plurality of flow operations. These flow operations, which may comprise flow tables, can be used to match attributes or traits within a data packet with defined attributes or traits, and provide actions and operations based on the matching. Here, a flow operation 420 is provided that is used to determine whether the packet comprises an ARP packet. An ARP packet may be identified, in some implementations, by flow operation 420 when the message contains an address resolution request or response, which can be identified by the protocol type included in the packet header. If the packet did not comprise an ARP packet, then the packet may be directed to first operations 421, which may comprise one or more additional flow tables for operations on the data packet. In some implementations, the operations may direct the packet to be transferred to the virtual switch controller if there is no rule for the packet currently available on the switch.

Referring to data packet 410 for the present example, the packet does comprise an ARP packet with a broadcast MAC address (FF:FF:FF:FF:FF:FF). In response to identifying that the packet does comprise an ARP packet and qualifies for a learn action, the learn action 422 is then implemented and applied against the received packet. Here, the learn action is directed at a Boolean operation to determine whether "ARP_SPA==First IP address AND ARP_TPA==FIRST IP ADDRESS." This complex Boolean function may not be possible using flow operations or flow tables, as the flow operations or tables compare values in the data packet to defined values. Instead, by applying the learn action, the virtual switch may be capable of identifying more information about the packet, and setting Boolean context (or an indicator value) for future flow operations. In the present example, when the Boolean operation is found to be TRUE for data packet 410 because address A 412 is equal to address B 414, learn action 422 sets a metadata value associated with the packet to 1 or TRUE. Once set, the packet is then forwarded to second operations 423, wherein the second operations may analyze the data packet and provide operations based on whether the metadata value has been set.

Although illustrated in the present example as setting a metadata value, it should be understood that other operations may be committed when the Boolean operation is found to be true. These operations may include modifying the packet, setting a virtual switch register, or some other similar indicator value operation. Additionally, when setting a value based on the Boolean function, the value may be associated with a priority rating. The priority rating or value may be used by second operations 423 to determine which actions should be applied to the packet. For example, if the packet qualified for multiple actions, the priority value may be used to determine which of the actions should be applied over other actions. Thus, metadata value X in FIG. 4 were associated with a higher priority action than another attribute associated with data packet 410, then the action associated with metadata value X would be applied over the action associated with the other attribute.

While illustrated in the example of FIG. 4 with the use of ARP and GARP packets, it should be understood that other operations may be provided by a learn function. For example, the learn function may be used to provide any Boolean operations against a data packet that would be incapable of being provided using the flow operations and tables.

Figure 5:
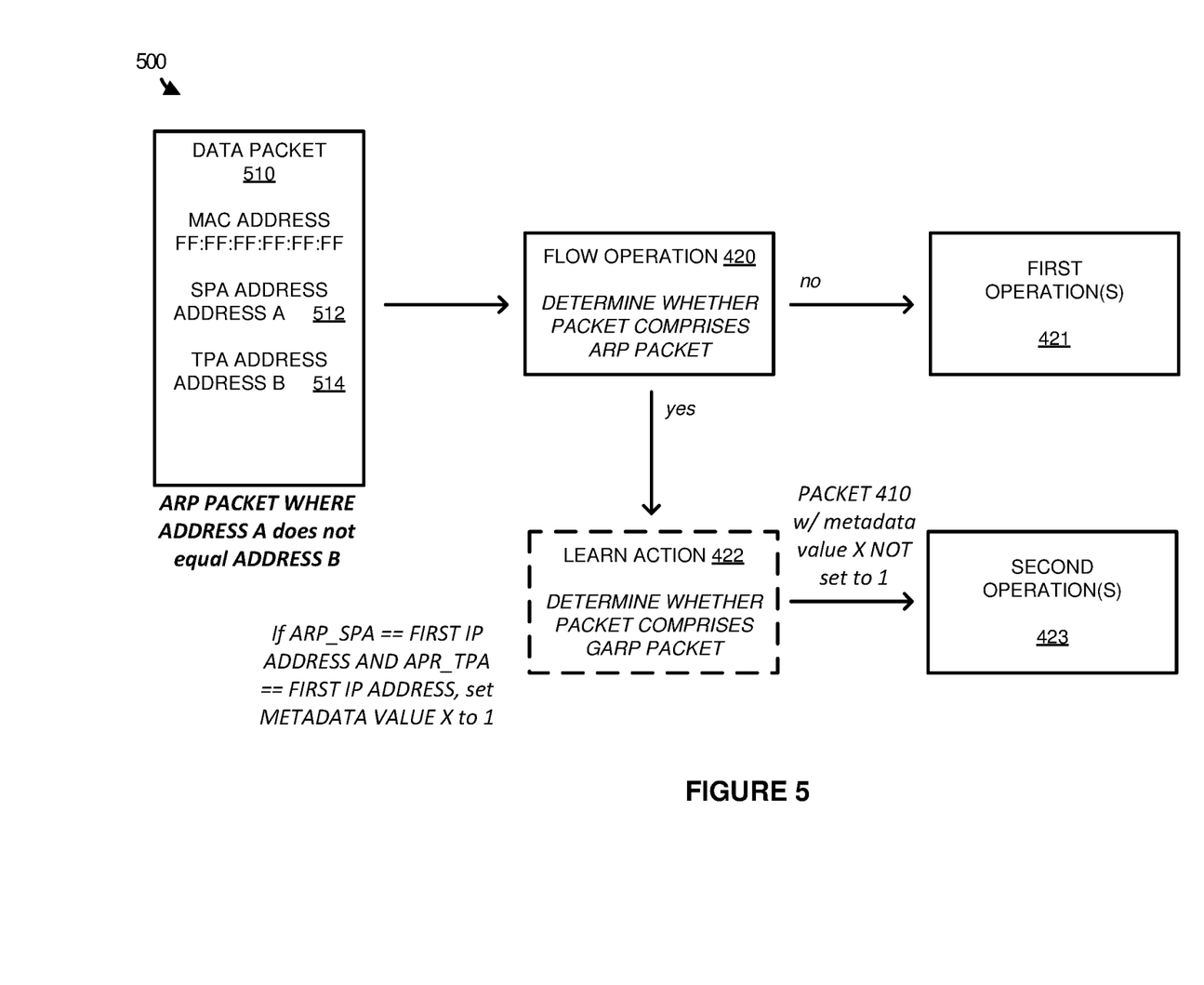
FIG. 5 illustrates an operational scenario of implementing flow operations in a virtual switch according to one implementation.

FIG. 5 illustrates an operational scenario 500 of implementing flow operations in a virtual switch according to one implementation. Operational scenario 500 includes the same flow operations and learn actions of FIG. 4, and further includes a new data packet 510. In particular, operational scenario 500 includes flow operation 420, first operations 421, learn action 422, and second operations 423. Data packet 510 includes a broadcast MAC address, a SPA address of address A 512, and a TPA address of address B 514, wherein address A and address B are not equal in value.

Similar to the operations described in FIG. 4, data packet 510 may be received from a computing node by the virtual switch. In response to receiving the data packet, the data packet may be processed according to a flow process, wherein the flow process includes one or more flow operations to be applied against the packet, and wherein the flow operations may comprise flow tables in some examples. In flow operation 420 of the flow process, data packet 510 may be processed to determine whether the data packet comprises an ARP packet. This determination may occur based on information provided in the packet. For example, flow operation 420 may search for specific values within the header of the packet to determine whether the packet is requesting an ARP resolution request or response. Once determined, the packet may be forwarded to the next appropriate operation or action.

In particular, if the packet does not comprise an ARP packet, then the packet may be forwarded to first operations 421, wherein the first operations may identify other attributes of the packet to determine forwarding actions that should be taken for the packet. In contrast, if the data packet does comprise an ARP packet, such as data packet 510, the packet will be processed by learn action 422 to identify supplementary information about the packet. In particular, because data packet 510 does qualify as an ARP packet, the virtual switch may generate learn action 422, wherein learn action 422 is used to identify whether the packet comprises a GARP packet. In the particular example of operational scenario 500, to determine if the packet is a GARP packet, learn action 422 will apply a Boolean operation to identify whether "ARP_SPA==First IP address AND APR_TPA==FIRST IP ADDRESS." If it is determined that the SPA address and the TPA address are the same address, then the data packet is a GARP packet and a metadata value may be set associated with the packet to indicate the operation. However, as provided for with data packet 510, if the SPA address and the TPA address are not equivalent then learn action 422 will not set the metadata value, and will instead forward the packet to second operations 423 without the value set. Once received by second operations 423, operations may be performed on the packet based on the attributes of the packet, including the lack of the metadata value.

Although illustrated in the present example as setting a metadata value, it should be understood that other operations may be committed when the Boolean operation is found to be true. These operations may include modifying the packet, setting virtual switch register, or some other similar indicator value operation. Additionally, when setting a value based on the Boolean function, the value may be associated with a priority rating. The priority rating or value may be used by second operations 423 to determine which actions should be applied to the packet. For example, if the packet qualified for multiple actions, the priority value may be used to determine which of the actions should be applied over other actions.

Further, while illustrated in the example of FIGS. 4 and 5 with the use of ARP and GARP packets, it should be understood that other operations may be provided by a learn function. For example, the learn function may be used to provide any Boolean operations against a data packet that would be incapable of being provided using the flow operations and tables. These Boolean operations may be used to compare various attributes within the packet, and provide additional complex operations on the data packet that can be used to identify forwarding actions for the packet.

Figure 6:
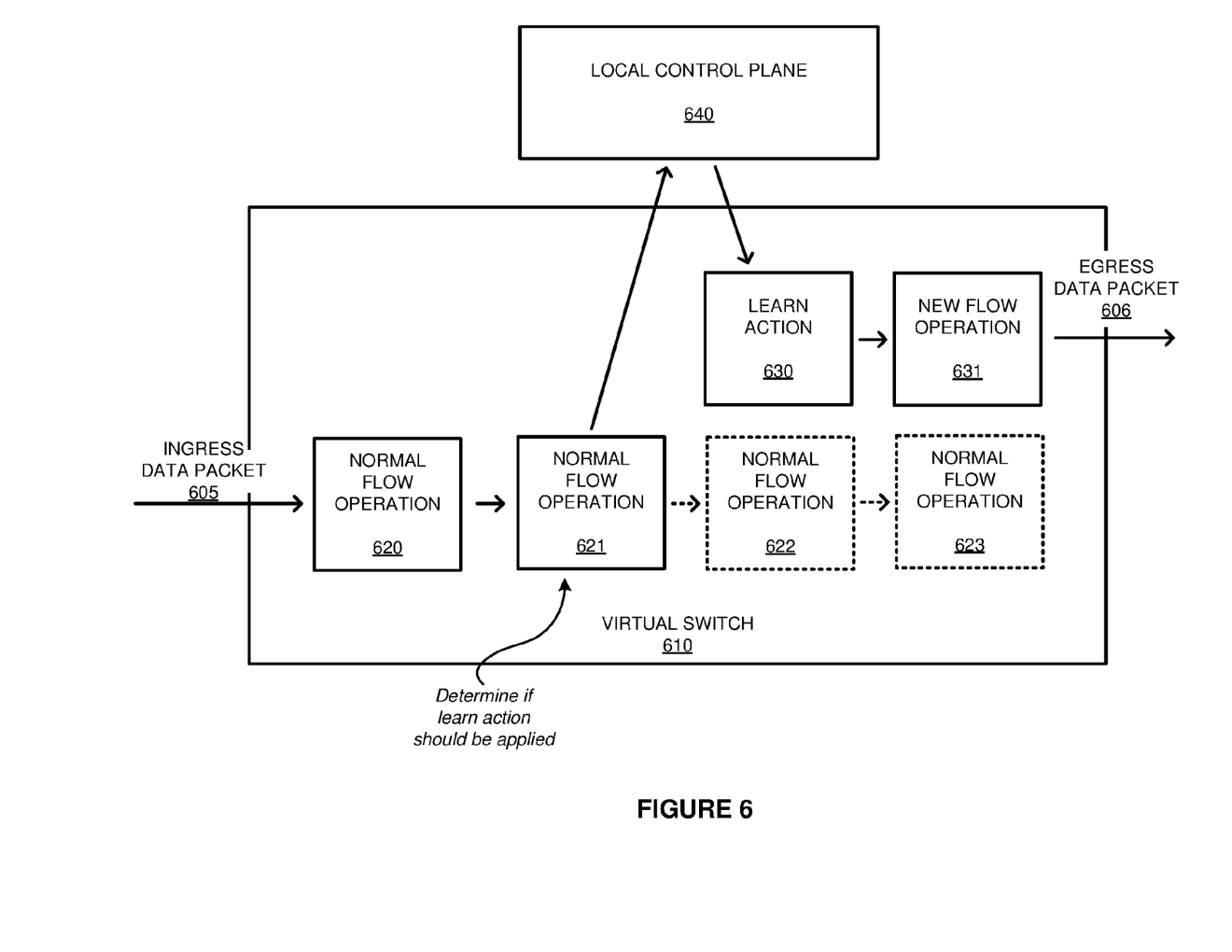
FIG. 6 illustrates a packet flow in a virtual switch according to one implementation.

FIG. 6 illustrates a packet flow in a virtual switch according to one implementation. FIG. 6 includes ingress packet 605, egress packet 606, virtual switch 610, and local control plane 640. FIG. 6 is an example of providing the data packet to a local control plane, and returning the packet to a learn action to provide complex Boolean operations on the data packet.

As depicted, ingress data packet 605 is received by virtual switch 610 from a computing node, wherein the computing node may comprise a virtual machine logically linked to the virtual switch. In response to receiving the packet, the virtual switch may initiate a flow process to pass the data packet through one or more flow operations to determine the forwarding actions that should be taken with respect to the packet. In particular, virtual switch may provide the packet to normal flow operation 620, which continues to normal flow operation 621. At normal flow operation 621, virtual switch 610 determines if the packet should qualify for a learn action. This determination may be based on attributes identified within the header, wherein the attributes may include a source IP address for the packet, a destination IP address for the packet, a source MAC address for the packet, a header type for the packet, or any other similar information within the packet. If it is determined that the packet does not qualify for the learn action, then the packet may be forwarded to normal flow operations 622-623 to determine the forwarding actions that should be taken with respect to the packet. Although illustrated with four normal flow operations in the present implementation, it should be understood that any number of flow operations may be taken against the packet.

If it is determined that the packet does qualify for the learn action, then normal flow operation 621 may direct the packet to local control plane 640. This local control plane represents the communications between a controller and the virtual switch that is used to provide configurations to the virtual switch. Here, after transferring the packet to the local control plane the packet is returned to the virtual switch, wherein the virtual switch will apply learn action 630. This transferring of the packet to local control plane 640 permits the packet to be received as a new packet by virtual switch, which in turn can direct the packet to learn action 630. In some examples, in transferring the packet to local control plane 640, virtual switch 610 may generate a flag or an identifier for the packet, wherein the flag may be used to direct the packet to learn action 630 when it is received from local control plane 640. In some implementations, a virtual switch controller on local control plane 640 may further provide new actions or rules based on the forwarded packet.

Once the packet is received from local control plane 640, learn action 630 may comprise conditional statements that apply complex Boolean operations on the data packet to set indicator values associated with the data packet. For example, the Boolean operations may be used to compare two values included in the data packet, such as MAC addresses, source and destination addresses, or some other information within the data packet. Based on the comparisons, indicator values may be set, wherein the setting the indicator values may include setting a metadata value, changing a value within the data packet, setting a virtual switch register associated with the data packet, or some other indicator value operation related to the data packet. Once the learn action is applied, the packet with any indicator values may be forwarded to new flow operation 631, which can determine a forwarding action to take based on the indicator value provided by learn action 630.

As an illustrative example, a Boolean operation at learn action 630 may be used to set a virtual switch register based on the comparison of two address attributes in the data packet, wherein the register may be associated with or allocated to the data packet by the virtual switch. This allocation may prevent the register from being used with other packets, and ensure that the register is available for future flow operations with the data packet. Once the register is set, the packet is then forwarded to new flow operation 631, wherein new flow operation 631 may provide operations based on whether the register is set. If the register is set, then new flow operation 631 may provide a first forwarding action associated with the data packet to other computing nodes. However, if the register is not set, then new flow operation may provide a different action with respect to the packet. Thus, learn action 630 may provide a determination or comparison between two values within the data packet to generate a single value, and new flow operation may provide operations with respect to the single value.

Although illustrated in the example of FIG. 6 as providing the data packet to new flow operation 631 in response to completing learn action 630, it should be understood that learn action 630 may return the packet to the original flow. For example, once learn action 630 is applied to the data packet, the packet may be returned to normal flow operation 622, continuing the original flow operations of the flow process. In some implementations, when applying learn action 630, learn action 630 may set a value that can be used as priority in determining the forwarding of the packet. This may allow virtual switch 610 to prioritize multiple actions when the packet applies to multiple forwarding actions. Thus, if learn action 630 did set a metadata value or some other value the packet may be forwarded according to a first forwarding action by new flow operation 631

Figure 7:
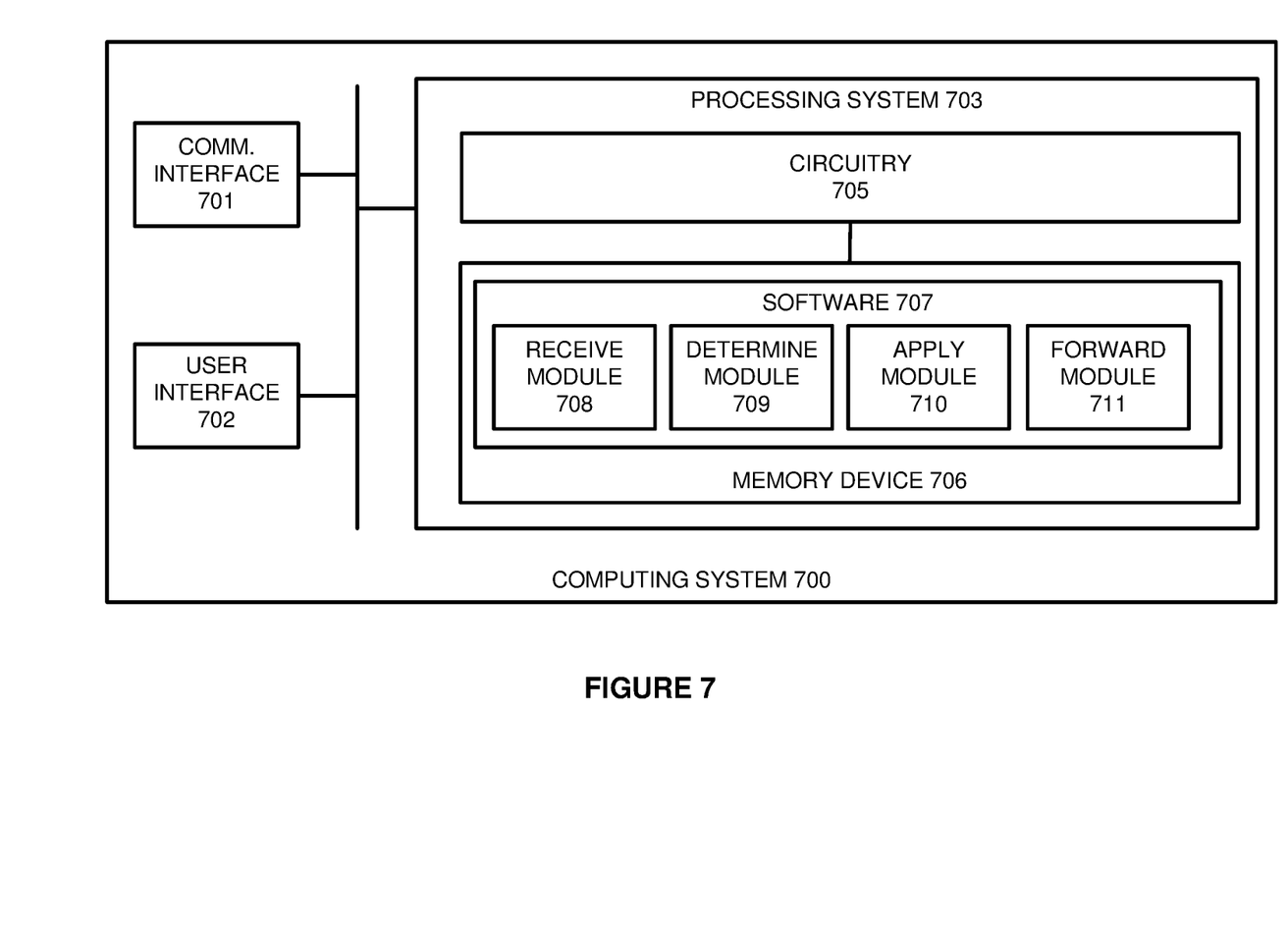
FIG. 7 illustrates a computing system to implement flow operations on a data packet according to one implementation.

FIG. 7 illustrates a computing system 700 to implement flow operations on a data packet according to one implementation. Computing system 700 is representative of any computing system or systems with which the various operational architectures, processes, scenarios, and sequences disclosed herein for learn actions in a virtual switch. Computing system 700 is an example of a computing system for implementing virtual switch 120, virtual switch 310, or virtual switch 610, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes receive module 708, determine module 709, apply module 710, and forward module 711, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In a particular example, receive module 708 directs processing system 703 to receive a packet from a computing node, wherein the computing node may comprise a virtual machine. In response to receiving the packet, the packet may be placed into a flow process with one or more flow operations. These flow operations may comprise a flow tables, in some examples, which comprise traits that can be compared to traits in the data packet. For example, a flow table may be used to identify a particular source IP address, a particular MAC address, or some other similar trait within a data packet. In the present example, a flow operation, represented by determine module 709, may direct processing system 703 to determine whether a packet qualifies for a learn action to be applied to the packet. This determination may be based on a particular attribute or attributes included within the packet. For example, determine module 709 may be applied to determine if the MAC address for the packet were the broadcast address. If determine module 709 determines that a learn action should not be applied to the packet, then the packet may be forwarded to the next operation in the flow process. However, if it is determined that the learn action should be applied, the learn action may be applied to the data packet via apply module 710.

In some implementations, apply module 710, when executed by processing system 703, directs processing system 703 to apply a Boolean function to multiple attributes within the data packet. This Boolean function may be used to compare multiple values within the data packet, such as IP addresses within the packet, MAC addresses included in the packet, or any other similar values included within the packet. Based on the application of the Boolean function apply module 710 may further direct processing system 703 to set a value associated with the packet. This setting of the value may include modifying the packet itself to show the result of the Boolean function, modifying a metadata value associated with the packet to show the result of the Boolean function, changing a register associated with the virtual switch as a result of the Boolean function, or some other similar operation. Once the value has been modified based on the Boolean function, forward module 711 may then direct processing system 703 to forward to the communication to a second flow process.

In some examples, to implement the learn action, in response to identifying that the learn action should be applied the packet may be transferred over the control plane and returned to the virtual switch. In response to receiving the packet, the learn action may be applied and packet forwarded to the second flow process for forwarding operations. In particular, the forwarding operations determined in the second flow process may be determined based on the value modified by the learn action. For example, if a metadata value were set to one for the data packet, then the packet may be forwarded to a first set of locations. In contrast, if the value were not set to a one, then the packet may be forwarded to a second set of locations.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of managing learn actions in a network switch having a forwarding plane controlled by a communications protocol, the method comprising:
    receiving a data packet from a computing node;
    initiating a first flow process for the data packet, wherein the first flow process comprises a plurality of flow operations to be performed against the data packet;
    in a flow operation of the plurality of flow operations, identifying whether the data packet qualifies for a learn action based on a protocol type identified from attributes in the data packet, wherein the learn action determines whether to set an indicator value associated with the packet for use by another flow operation based on a comparison of two or more address values in the data packet;
    if the data packet fails to qualify for the learn action, forwarding the data packet to a next flow operation in the plurality of flow operations;
    if the data packet qualifies for the learn action, applying the learn action to the data packet and forwarding the data packet to a next flow operation.

2. The method of claim 1 wherein the computing node comprises a virtual machine.

3. The method of claim 1 wherein applying the learn action to the data packet comprises applying the learn action to compare the two or more address values in the data packet to determine whether to set at least one metadata bit associated with the data packet and, if at least one metadata bit associated with the data packet is to be set, setting the at least one metadata bit prior to forwarding the data packet to a next flow operation.

4. The method of claim 1 wherein applying the learn action to the data packet comprises applying a Boolean function to the two or more address values in the data packet to compare the two or more address values and setting an indicator value associated with the data packet based on the application of the Boolean function.

5. The method of claim 4 wherein the indicator value associated with the data packet comprises one of a metadata value associated with the data packet, a virtual switch register, or a value in the data packet.

6. The method of claim 1 wherein applying the learn action to the data packet comprises applying the learn action to the data packet to determine whether the data packet comprises a Gratuitous Address Resolution Protocol (GARP) packet and, if the data packet comprises a GARP packet, setting an indicator value associated with the data packet prior to forwarding the data packet to a next flow operation, and wherein identifying whether the data packet qualifies for the learn action comprises identifying whether the data packet comprises an Address Resolution Protocol (ARP) packet.

7. The method of claim 1 wherein applying the learn action to the data packet to compare the two or more address values comprises applying the learn action to the data packet to compare two internet protocol (IP) addresses in the data packet.

8. The method of claim 1 wherein applying the learn action to the data packet comprises applying the learn action to the data packet to determine a priority level for the data packet, wherein the priority level is used to prioritize overlapping actions to be taken based on attributes in the data packet.

9. A computer apparatus comprising:
one or more non-transitory computer readable storage media;
a processing system operatively coupled with the one or more non-transitory computer readable storage media; and
program instructions stored on the one or more non-transitory computer readable storage media to manage learn actions in a network switch having a forwarding plane controlled by a communication protocol that, when read and executed by the processing system, direct the processing system to at least:
receive a data packet from a computing node;
initiate a first flow process for the data packet, wherein the first flow process comprises a plurality of flow operations to be performed against the data packet;
in a flow operation of the plurality of flow operations, identify whether the data packet qualifies for a learn action based on a protocol type identified from attributes in the data packet, wherein the learn action determines whether to set an indicator value associated with the packet for use by another flow operation based on a comparison of two or more address values in the data packet;
if the data packet fails to qualify for the learn action, forward the data packet to a next flow operation in the plurality of flow operations; and
if the data packet qualifies for the learn action, apply the learn action to the data packet and forward the data packet to a next flow operation.

10. The computing apparatus of claim 9 wherein the computing node comprises a virtual machine.

11. The computing apparatus of claim 9 wherein the program instructions to apply the learn action to compare the two or more address values in the data packet direct the processing system to apply the learn action to the data packet to determine whether to set at least one metadata bit associated with the data packet and, if at least one metadata bit associated with the data packet is to be set, set the at least one metadata bit prior to forwarding the data packet to a next flow operation.

12. The computing apparatus of claim 9 wherein the program instructions to apply the learn action to the data packet direct the processing system to apply a Boolean function to the two or more address values in the data packet to compare the two or more address values, and set an indicator value associated with the data packet based on the application of the Boolean function.

13. The computing apparatus of claim 12 wherein the indicator value associated with the data packet comprises one of a metadata value associated with the data packet, a virtual switch register, or a value in the data packet.

14. The computing apparatus of claim 9 wherein the program instructions to apply the learn action to the data packet direct the processing system to apply the learn action to the data packet to determine whether the data packet comprises a Gratuitous Address Resolution Protocol (GARP) packet and, if the data packet comprises a GARP packet, set an indicator value associated with the data packet prior to forwarding the data packet to a next flow operation, and wherein the program instructions to identify whether the data packet qualifies for the learn action direct the processing system to identify whether the data packet comprises an Address Resolution Protocol (ARP) packet.

15. The computing apparatus of claim 9 wherein the program instructions to apply the learn action to the data packet to compare the two or more address values direct the processing system to apply the learn action to the data packet to compare two internet protocol (IP) addresses in the data packet.

16. The computing apparatus of claim 9 wherein the program instructions to apply the learn action to the data packet direct the processing system to apply the learn action to the data packet to determine a priority level for the data packet, wherein the priority level is used to prioritize overlapping actions to be taken based on information in the data packet.

17. An apparatus comprising:
one or more non-transitory computer readable storage media; and
program instructions stored on the one or more non-transitory computer readable storage media to manage learn actions in a network switch having a forwarding plane controlled by a communication protocol that, when read and executed by a processing system, direct the processing system to at least:
receive a data packet from a computing node;
initiate a first flow process for the data packet, wherein the first flow process comprises a plurality of flow operations to be performed against the data packet;
in a flow operation of the plurality of flow operations, identify whether the data packet qualifies for a learn action based on a protocol type identified from attributes in the data packet, wherein the learn action determines whether to set an indicator value associated with the packet for use by another flow operation based on a comparison of two or more address values in the data packet;
if the data packet fails to qualify for the learn action, forward the data packet to a next flow operation in the plurality of flow operations; and
if the data packet qualifies for the learn action, apply the learn action to the data packet forward the data packet to a next flow operation.

18. The apparatus of claim 17 wherein the program instructions to apply the learn action to compare the two or more address values in the data packet direct the processing system to apply the learn action to the data packet to determine whether to set at least one metadata bit associated with the data packet and, if at least one metadata bit associated with the data packet is to be set, setting the at least one metadata bit prior to forwarding the data packet to a next flow operation.

19. The apparatus of claim 17 wherein the program instructions to apply the learn action to the data packet direct the processing system to apply a Boolean function to the two or more address values in the data packet to compare the two or more address values, and set an indicator value associated with the data packet based on the application of the Boolean function.

20. The apparatus of claim 17 wherein the indicator value associated with the data packet comprises one of a metadata value associated with the data packet, a virtual switch register, or a value in the data packet.

* * * * *